US008055242B2

(12) United States Patent
Park et al.

(10) Patent No.: US 8,055,242 B2
(45) Date of Patent: Nov. 8, 2011

(54) METHOD, APPARATUS AND SYSTEM FOR PROCESSING BROADCASTING APPLICATION IN DIGITAL BROADCASTING

(75) Inventors: Jung-Hun Park, Yongin-si (KR); Byung-Wook Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 886 days.

(21) Appl. No.: 11/966,016

(22) Filed: Dec. 28, 2007

(65) Prior Publication Data

US 2008/0160975 A1 Jul. 3, 2008

(30) Foreign Application Priority Data

Dec. 29, 2006 (KR) ........................ 10-2006-0138438

(51) Int. Cl.
*H04M 11/00* (2006.01)
(52) U.S. Cl. ...................................... 455/412.1; 725/28
(58) Field of Classification Search ............... 455/412.1, 455/412.2; 725/28
See application file for complete search history.

(56) References Cited

U.S. PATENT DOCUMENTS

2004/0242203 A1* 12/2004 Lipsanen et al. ........... 455/412.1
2007/0079324 A1*  4/2007 Hallford et al. ................ 725/28

FOREIGN PATENT DOCUMENTS

| EP | 1 259 075 | 11/2002 |
| KR | 20010083947 | 3/2001 |
| KR | 1020060080946 | 7/2006 |

* cited by examiner

*Primary Examiner* — Phuoc Doan (74) *Attorney, Agent, or Firm* — The Farrell Law Firm, P.C.

(57) ABSTRACT

Disclosed is a method, apparatus and system for processing a broadcast application in digital broadcasting. The system includes a digital broadcasting server for generating guide data, including content genre information corresponding to respective programs, and transmitting the guide data and digital broadcasting data corresponding to the respective programs; and a portable terminal for receiving and storing the guide data, receiving digital broadcast data corresponding to a requested program if a user requests digital broadcasting viewing/listening, analyzing the received guide data to thereby retrieve content genre information corresponding to the requested program, retrieving and executing a special broadcasting application corresponding to the retrieved content genre information, and outputting the received digital broadcasting data by means of the executed special broadcasting application. Various broadcasting applications and broadcasting applications specific to respective content genres can be provided to a user.

22 Claims, 6 Drawing Sheets

```
<complexType name="ContentType">
  <sequence>
    <element name="Title" type="mpeg7:TitleType" minOccurs="0"
      maxOccurs="unbounded"/>
    <element name="MediaTitle" type="mpeg7:TitleMediaType" minOccurs="0"
      maxOccurs="unbounded"/>
    <element name="ServiceRef" type="esg:ESGIDRefType" minOccurs="0"
      maxOccurs="unbounded"/>
    <element name="Synopsis" type="tva:SynopsisType" minOccurs="0"
      maxOccurs="unbounded"/>
    <element name="Keyword" type="tva:KeywordType" minOccurs="0"
      maxOccurs="unbounded"/>
    <element name="Genre" type="tva:GenreType" minOccurs="0"           ~305
      maxOccurs="unbounded"/>
    <element name="ContentType" type="tva:ControlledTermType" minOccurs="0"
      maxOccurs="unbounded"/>
    <element name="ParentalGuidance" type="mpeg7:ParentalGuidanceType"
      minOccurs="0" maxOccurs="unbounded"/>
    <element name="Language" type="mpeg7:ExtendedLanguageType" minOccurs="0"
      maxOccurs="unbounded"/>
    <element name="CaptionLanguage" type="tva:CaptionLanguageType"
      minOccurs="0" maxOccurs="unbounded"/>
    <element name="SignLanguage" type="tva:SignLanguageType" minOccurs="0"
      maxOccurs="unbounded"/>
    <element name="CreditsList" type="tva:CreditsListType" minOccurs="0"/>
    <element name="RelatedMaterial" type="esg:RelatedMaterialType"
      minOccurs="0" maxOccurs="unbounded"/>
    <element name="Duration" type="duration" minOccurs="0"/>
    <element name="PrivateData" type="esg:PrivateDataType" minOccurs="0"
      maxOccurs="unbounded" />
  </sequence>
  <attribute name="contentID" type="anyURI" use="required"/>           ~301
  <attribute name="Special App" type="int" use="required"/>            ~303
</complexType>
```

METHOD, APPARATUS AND SYSTEM FOR PROCESSING BROADCASTING APPLICATION IN DIGITAL BROADCASTING

PRIORITY

This application claims priority under 35 U.S.C. §119(a) of an application entitled "Method, Apparatus and System for processing Broadcasting Application in Digital Broadcasting" filed in the Korean Industrial Property Office on Dec. 29, 2006 and assigned Serial No. 2006-138438, the contents of which are incorporated herein by reference.

BACKGROUND OF THE INVENTION

1. Field of the Invention

The present invention relates to digital broadcasting, and more particularly to a method, apparatus and system for processing a broadcasting application through which digital broadcasting is implemented.

2. Description of the Related Art

As well known in the art, digital broadcasting refers to a broadcasting scheme for digitally transmitting broadcasting signals, which have been conventionally transmitted in an analog manner, in order to provide users with high video quality, high audio quality and more diverse services. Such digital broadcasting employs various technical standards including DVB-T (Digital Video Broadcasting-Terrestrial), DAB (Digital Audio Broadcasting), DMB (Digital Multimedia Broadcasting), MediaFLO, DVB-H (Digital Video Broadcasting-Handheld), etc.

Among them, the DMB and DVB-H standards applicable to mobile digital broadcasting have been established in order to provide a terminal on the move with digital broadcasting at a high rate of reception, and can implement mobile digital multimedia broadcasting capable of providing high video- and audio-quality broadcasting anytime and anywhere, even while a user drives or walks.

However, a receiving terminal for digital broadcasting receives digital broadcasting data including various content genres, and yet outputs the received broadcasting data by executing the same broadcasting application. Consequently, because the conventional receiving terminal cannot differentiate between broadcasting applications according to various content genres, and thus fails to provide a user with various broadcasting applications constitutes a problem.

Also, the conventional receiving terminal has another problem in that it cannot provide a user with various content genre-specific broadcasting applications.

SUMMARY OF THE INVENTION

Accordingly, the present invention solves at least the above-mentioned problems occurring in the prior art, and the present invention provides a receiving terminal for digital broadcasting, which provides a user with various broadcasting applications by differentiating between broadcasting applications according to various content genres.

Further, the present invention provides a receiving terminal for digital broadcasting, which provides a user with broadcasting applications specific to respective content genres.

In accordance with an aspect of the present invention, there is provided a system for processing a broadcasting application in digital broadcasting, the system includes a digital broadcasting server for generating guide data, including content types information corresponding to respective programs, and transmitting the guide data and digital broadcasting data corresponding to the respective programs; and a portable terminal for receiving and storing the guide data, receiving digital broadcasting data corresponding to a requested program if a user requests digital broadcasting viewing/listening, analyzing the received guide data to thereby retrieve content genre information corresponding to the requested program, retrieving and executing a special broadcasting application corresponding to the retrieved content genre information, and outputting the received digital broadcasting data by means of the executed special broadcasting application.

In accordance with another aspect of the present invention, there is provided a method of processing a broadcasting application in digital broadcasting, the method includes the steps of generating guide data, including content types information corresponding to respective programs, and transmitting the guide data and digital broadcasting data corresponding to the respective programs by a digital broadcasting server; and receiving and storing the guide data, receiving digital broadcasting data corresponding to a requested program if a user requests digital broadcasting viewing/listening, analyzing the received guide data to thereby retrieve content genre information corresponding to the requested program, retrieving and executing a special broadcasting application corresponding to the retrieved content genre information, and outputting the received digital broadcasting data by means of the executed special broadcasting application by a portable terminal.

In accordance with yet another aspect of the present invention, there is provided a method of processing a broadcasting application in a digital broadcasting server, the method includes the steps of generating guide data, including content types information corresponding to respective programs and broadcasting application information; and transmitting the guide data and digital broadcasting data corresponding to the respective programs.

In accordance with yet another aspect of the present invention, there is provided a method of processing a broadcasting application in a portable terminal, the method includes the steps of receiving and storing guide data, including content types information corresponding to respective programs and broadcasting application information; receiving digital broadcasting data corresponding to a requested program if a user requests digital broadcasting viewing/listening; analyzing the received guide data to thereby retrieve content types information corresponding to the requested program; retrieving and executing a special broadcasting application corresponding to the retrieved content types information; and outputting the received digital broadcasting data by means of the executed special broadcasting application.

In accordance with yet another aspect of the present invention, there is provided an apparatus for processing a broadcasting application in a digital broadcasting server, the apparatus includes the digital broadcasting server for generating guide data, including content genre information corresponding to respective programs, and transmitting the guide data and digital broadcasting data corresponding to the respective programs.

In accordance with still another aspect of the present invention, there is provided an apparatus for processing a broadcasting application in a portable terminal, the apparatus includes a memory unit for storing guide data, including content types information corresponding to respective programs, and storing special broadcasting applications corresponding to the respective content types information and a default broadcasting application in advance; and a control unit for receiving digital broadcasting data corresponding to a requested program if a user requests digital broadcasting viewing/listening, analyzing the received guide data to thereby retrieve content types information corresponding to the requested program, retrieving and executing a special broadcasting application corresponding to the retrieved content types information, and outputting the received digital broadcasting data by means of the executed special broadcasting application.

BRIEF DESCRIPTION OF THE DRAWINGS

The above and other aspects, features and advantages of the present invention will be more apparent from the following detailed description taken in conjunction with the accompanying drawings, in which:

FIG. 3 is an example of a content fragment syntax included in an electronic service guide (ESG) according to the present invention;

DETAILED DESCRIPTION OF THE PREFERRED EMBODIMENT

Hereinafter, exemplary embodiments of the present invention will be described with reference to the accompanying drawings. It should be noted that similar components are designated by similar reference numerals although they are illustrated in different drawings. Also, in the following description, a detailed description of known functions and configurations incorporated herein will be omitted when it may obscure the subject matter of the present invention.

Figure 1:
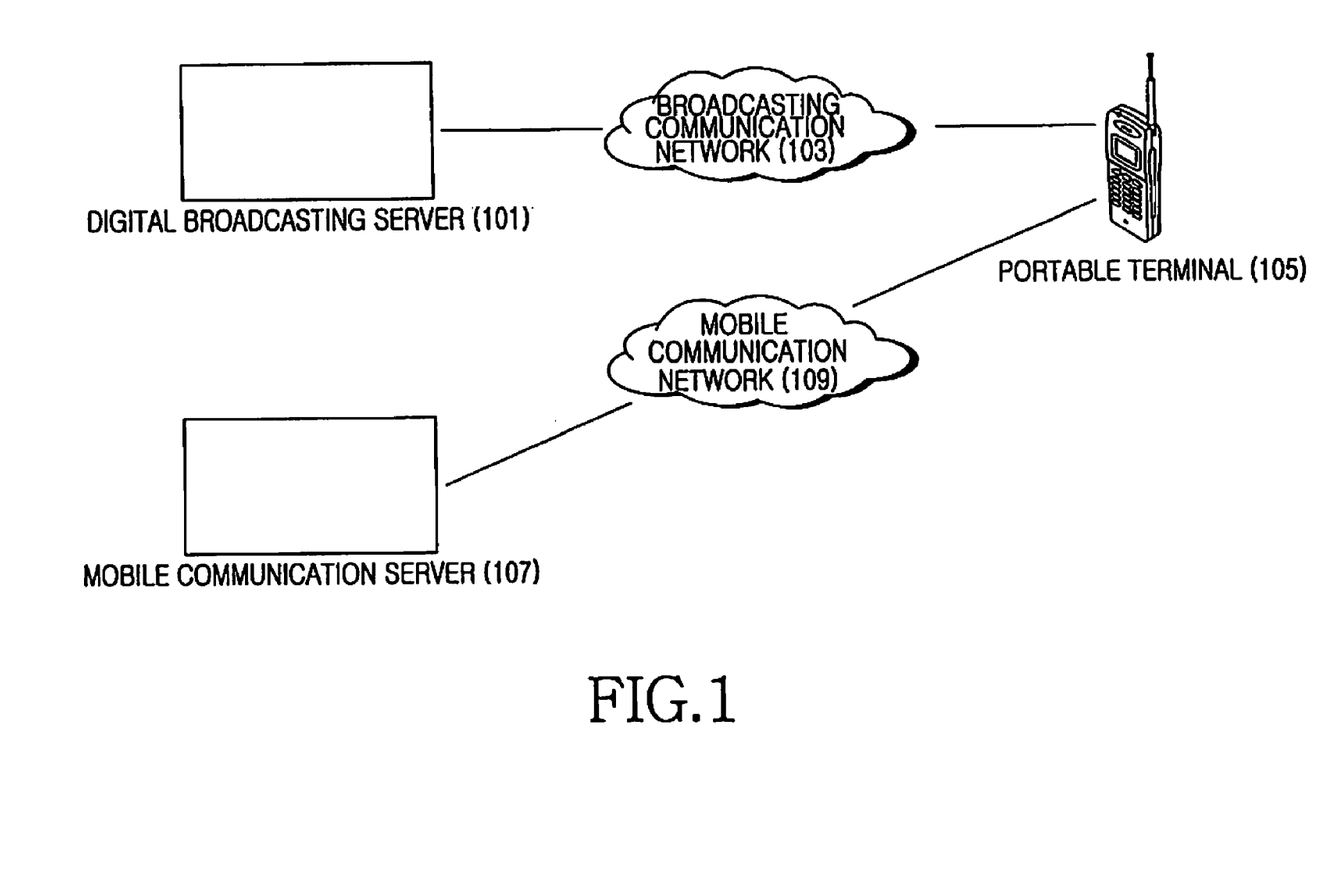
FIG. 1 is an overview of a digital broadcasting system according to the present invention.

Reference will now be made to constituent elements of a digital broadcasting system with reference to FIG. 1 illustrating a digital broadcasting system according to the present invention.

The digital broadcasting system according to this embodiment includes a digital broadcasting server 101, a broadcasting communication network 103, a portable terminal 105, a mobile communication server 107, and a mobile communication network 109.

Among such constituent elements, the digital broadcasting server 101 transmits digital broadcasting data for providing digital broadcasting services and guide data including organization information of the digital broadcasting services. Particularly, in the present invention, the digital broadcasting server 101 transmits guide data, including content types information of respective digital broadcasting data and broadcasting application information indicating whether or not to provide special broadcasting applications specific to respective content genres.

As an example, when digital broadcasting server 101 follows a DMB (Digital Multimedia Broadcasting) technology standard, the above-mentioned guide data may be an electronic program guide (EPG). Further, digital broadcasting server 101 may store electronic program guide data including content types information and broadcasting application information, and transmit the electronic program guide data through an electronic program guide channel.

As another example, when digital broadcasting server 101 follows a DVB-H (Digital Video Broadcasting-Handheld) technology standard, the above-mentioned guide data may be an electronic service guide (ESG). Further, digital broadcasting server 101 may store electronic service guide data, including content genre information and broadcasting application information, and transmit the electronic service guide data through an electronic service guide channel.

A broadcasting application refers to an application for reproducing and outputting digital broadcasting data, and may output a broadcasting content-related user interface together when outputting digital broadcasting data. A user can view/listen to a broadcast session through such a broadcast application. According to the present invention, a broadcasting application may be divided into a default broadcasting application and a special broadcasting application, and may be provided to portable terminal 105 by means of digital broadcasting server 101 or mobile communication server 107. The default broadcasting application can output all broadcasting programs irrespective of their contents types, and can provide a user interface applicable to all the broadcasting programs. For example, the default broadcasting application can output digital broadcasting data corresponding to all broadcasting programs, and may include functions such as volume adjustment, etc.

The special broadcasting application refers to an application for supporting a digital broadcasting data output scheme according to a corresponding content type or providing a user interface specific to a corresponding content type in order to emphasize the characteristic of the content type of each broadcasting program. For example, when the content genre of any program is a music genre, a music broadcasting application may output digital broadcasting data corresponding to a music program in a surround sound stereo mode and provide a user interface including functions specific to the music genre, such as equalizer adjustment, etc.

Further, separate special broadcasting applications may exist according to platforms of portable terminal 107, and even for the same platform, separate special broadcasting applications may exist according to content types.

Digital broadcasting server 101 may store broadcasting application data specific to respective content genres and transmit different broadcasting application data according to content genres through a data channel. Portable terminal 105 may receive and store transmitted broadcasting applications.

Broadcasting communication network 103 receives digital broadcasting data and guide data from digital broadcasting server 101 and transmits them to portable terminal 105. As an example, when digital broadcasting server 101 follows a satellite DMB technology standard, broadcasting communication network 103 may be a satellite broadcasting communication network 103. As another example, when the digital broadcasting server 101 follows a terrestrial DMB technology standard, broadcasting communication network 103 may be a terrestrial broadcasting communication network 103. As yet another example, when digital broadcasting server 101 follows a DVB-H technology standard, broadcasting communication network 103 may be a terrestrial broadcasting communication network 103.

According to an exemplary embodiment of the present invention, mobile communication server 107 may store broadcasting application data specific to respective content types. If a user of any portable terminal 105 requests mobile communication server 107 to transmit a broadcasting application, mobile communication server 107 may transmit broadcasting application data requested by the user to his/her portable terminal 105 through mobile communication network 109.

Portable terminal 105 receives digital broadcasting data, and provides a user with a digital broadcasting service by processing the received digital broadcasting data by means of a prestored broadcasting application corresponding to a relevant content type. Particularly, in the present invention, portable terminal 105 receives and stores guide data transmitted from digital broadcasting server 101. Subsequently, if a user selects a broadcasting channel for viewing/listening to digital broadcasting, portable terminal 105 receives digital broadcasting data of the corresponding broadcasting channel. Further, portable terminal 105 analyzes the stored guide data to thereby check the genre of a broadcasting content which the broadcasting channel selected by the user is currently providing. Portable terminal 105 executes a prestored broadcasting application according to the checked genre, and provides the user with a digital broadcasting service by processing the digital broadcasting data by means of the executed broadcasting application.

When the broadcasting application corresponding to the genre of the broadcasting content is not prestored, portable terminal 105 may receive the broadcasting application from digital broadcasting server 101 or mobile communication server 107 and store the received broadcasting application.

Although any one of digital broadcasting server 101 and mobile communication server 107 stores different broadcasting applications according to content genres in the digital broadcasting system of FIG. 1, the broadcasting applications may be stored in ways other than in this embodiment.

The constituent elements of the digital broadcasting system according to the present invention have been described above with reference to FIG. 1. Reference will now be made to constituent elements of a receiving terminal for digital broadcasting, that is, portable terminal 105, with reference to FIG. 2.

Figure 2:
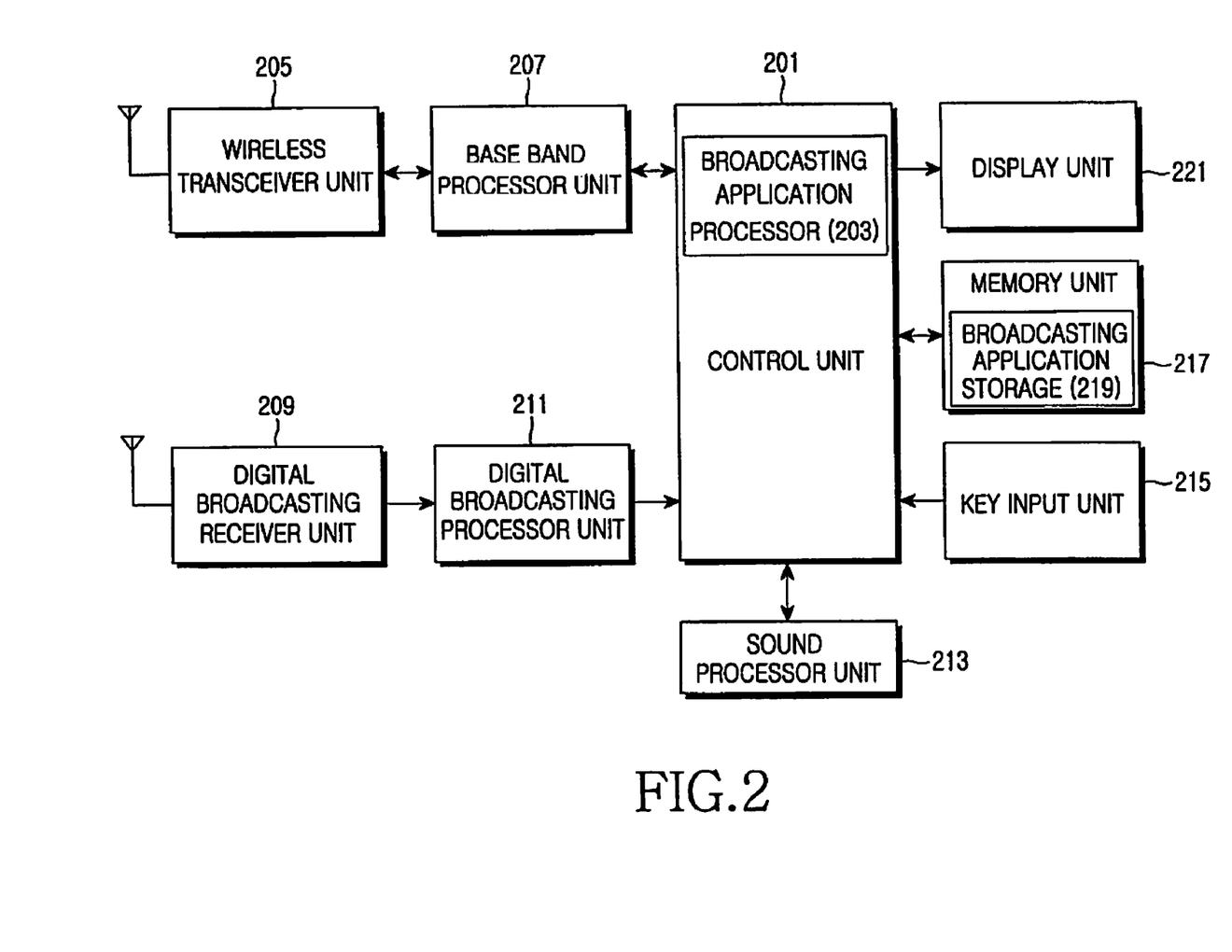
FIG. 2 is a block diagram of a receiving terminal for digital broadcasting according to the present invention.

Portable terminal 105 includes a control unit 201, a wireless transceiver unit 205, a base band processor unit 207, a digital broadcasting receiver unit 209, a digital broadcasting processor unit 211, a sound processor unit 213, a key input unit 215, a memory unit 217, and a display unit 221.

Among such constituent elements, wireless transceiver unit 205 has an RF transmitter for up-converting the frequency of a transmitted signal and amplifying the transmitted signal, an RF receiver for low-noise amplifying a received signal and down-converting its frequency, and so forth. Base band processor unit 207 has a transmitter for encoding and modulating a transmitted signal, a receiver for demodulating and decoding a received signal, and so forth.

Digital broadcasting receiver unit 209 wirelessly receives an RF signal of digital broadcasting data, low-noise amplifies the received RF signal, and down-converts its frequency. Particularly, in the present invention, digital broadcasting receiver unit 209 receives guide data including content genre information and broadcasting application information and receives digital broadcasting data of a broadcasting channel selected by a user.

Digital broadcasting processor unit 211 receives an RF signal input from digital broadcasting receiver unit 209, demodulates the received RF signal into digital broadcasting data of a base band signal, and applies it to control unit 201. Particularly, in the present invention, digital broadcasting processor unit 211 receives an input RF signal including guide data and digital broadcasting data from the digital broadcasting receiver unit 209, demodulates the received input RF signal into digital broadcasting data of a base band signal, and then outputs it to control unit 201.

Sound processor unit 213 receives a sound signal output from control unit 201, and outputs the received sound signal as an audible signal. Key input unit 215 consists of numeral keys for digital broadcasting viewing/listening (including the "*" and "#" keys) and various function keys. Key input unit 215 generates a key signal corresponding to a key pressed by a user and outputs the generated key signal to control unit 201.

Display unit 221 displays the current state and operational states of portable terminal 105 under the control of control unit 201, and may generally be formed by an LCD (Liquid Crystal Display) or an OLED (Organic Light Emitting Diode).

Memory unit 217 stores data necessary for controlling portable terminal 105. Particularly, in the present invention, memory unit 217 stores guide data including organization information of digital broadcasting data, and stores respective special broadcasting applications corresponding to content genres and a default broadcasting application independent of content genres in a broadcasting application storage 219.

Control unit 201 controls the respective units of portable terminal 105 so as to provide a digital broadcasting service. Particularly, in the present invention, control unit 201 continually receives digital broadcasting data of a corresponding broadcasting channel when a user selects the corresponding broadcasting channel for viewing/listening to digital broadcasting. Further, control unit 201 detects content genre information and broadcasting application information from pre-stored guide data. Based on the detected broadcasting application information, a broadcasting application processor 203 of the control unit 201 checks whether or not portable terminal 105 currently supports a corresponding broadcasting application. When portable terminal 105 supports the corresponding broadcasting application, the broadcasting application processor 203 of control unit 201 retrieves a special broadcasting application corresponding to the detected content genre from broadcasting application storage 219 of memory unit 217, executes the retrieved special broadcasting application, and outputs currently received digital broadcasting data by means of the executed special broadcasting application.

When portable terminal 105 does not support the corresponding special broadcasting application, broadcasting application processor 203 of control unit 201 may retrieve the default broadcasting application from the broadcasting application storage 219 of memory unit 217, execute the retrieved default broadcasting application, and output currently received digital broadcasting data by means of the executed default broadcasting application.

If a user requests downloading a special broadcasting application corresponding to the genre of a broadcasting content currently provided by a broadcasting channel because the special broadcasting application is not stored in memory unit 217, control unit 201 may receive the corresponding special broadcasting application from digital broadcasting server 101 or mobile communication server 107, and then store the received special broadcasting application in broadcasting application storage 219. Further, broadcasting application processor 203 of control unit 201 may execute the stored special broadcasting application and output currently received digital broadcasting data by means of the executed special broadcasting application.

Dissimilar to this, if a special broadcasting application corresponding to the genre of a broadcasting content currently provided by a broadcasting channel is not stored in memory unit 217, and a user does not request its download, broadcasting application processor 203 of control unit 201 may retrieve the default broadcasting application from broadcasting application storage 219 of memory unit 217. Further, broadcasting application processor 203 of control unit 201 may execute the retrieved default broadcasting application and output currently received digital broadcasting data by means of the executed default broadcasting application.

Hereinafter, a detailed description will be given of a process in which portable terminal 105 retrieves content genre information and broadcasting application information included in ESG data, with reference to FIG. 3. For the convenience of explanation, it will be assumed that portable terminal 105 is a receiving terminal for digital broadcasting that follows a DVB-H technology standard.

When digital broadcasting server 101 generates ESG data, it may generate the ESG data in such a manner as to include special broadcasting application information containing the platform type for a special broadcasting application, etc. As an example, when digital broadcasting server 101 generates ESG data, it may generate the ESG data in such a manner that a special broadcasting application field 303 including special broadcasting application information within a content fragment corresponding to each program is added to the ESG data. Further, digital broadcasting server 101 may transmit the ESG data including the special broadcasting application information.

Digital broadcasting server 101 may also configure special broadcasting application field 303 in such a manner as to include execution information indicating whether a default broadcasting application or a special broadcasting application is executed for a current program. Further, when a special broadcasting application is executed for a current program, digital broadcasting server 101 may include information on the platform type of the special broadcasting application in special broadcasting application field 303.

For example, if the content of a current program is reproduced only by executing a default broadcasting application, digital broadcasting server 101 may generate a special broadcasting application field 303 in such a manner as to include symbol "0" in the "Special App" column. Further, if the content of a current program is reproduced by executing a special broadcasting application corresponding to a relevant genre, and the special broadcasting application is executed in a Java platform, digital broadcasting server 101 may generate a special broadcasting application field 303 in such a manner as to include symbol "1" in the "Special App" column.

If the content of a current program is reproduced by executing a special broadcasting application corresponding to a relevant genre, and the special broadcasting application is executed in a BREW platform, digital broadcasting server 101 may generate a special broadcasting application field in such a manner as to include symbol "2" in the "Special App" column. Further, if the content of a current program is reproduced by executing a special broadcasting application corresponding to a relevant genre, and the special broadcasting application is executed in a WIPI platform, digital broadcasting server 101 may generate a special broadcasting application field in such a manner as to include symbol "3" in the "Special App" column.

In addition, digital broadcasting server 101 may indicate other platforms, in which corresponding special broadcasting applications are executed, according to symbols included in the "Special App" column.

If a user requests digital broadcasting viewing/listening and selects a broadcasting channel, control unit 201 of portable terminal 105 receives digital broadcasting data from the corresponding broadcasting channel. Further, control unit 201 also retrieves a content fragment corresponding to a current program of the corresponding broadcasting channel from a prestored ESG. Control unit 201 further retrieves a content ID field 301 including content genre information and a special broadcasting application field 303 including broadcasting application information within the retrieved content fragment.

Control unit 201 may check a content genre by means of an ID entered in the "ContentID" column. Control unit 201 may also check broadcasting application information corresponding to a current program by means of a symbol entered in the "Special App" column. Further, control unit 201 retrieves and executes a default broadcasting application or a special broadcasting application corresponding to the content genre of the current program, and outputs digital broadcasting data by means of the executed broadcasting application.

As an example, when symbol "0" is entered in the "Special App" column included in special broadcasting application field 303, control unit 201 may retrieve a default broadcasting application from memory unit 217 and execute the retrieved default broadcasting application. Further, control unit 201 may output digital broadcasting data by means of the executed default broadcasting application.

As another example, when symbol "1" is entered in the "Special App" column included in special broadcasting application field 303, control unit 201 checks if portable terminal 105 supports a special broadcasting application generated according to a Java platform. If portable terminal 105 supports a special broadcasting application to be executed in a Java platform, control unit 201 may retrieve a special broadcasting application corresponding to the content genre of a current program from memory unit 217. Further, control unit 201 may execute the retrieved special broadcasting application and output digital broadcasting data by means of executed special broadcasting application.

Although control unit 201 of portable terminal 105 checks the content genre of a current program by means of content ID field 301 in the above-mentioned process, it may also check the content genre through a symbol that is entered in the "Genre" column included in a genre field 305.

For example, control unit 201 checks if characters "sports" are entered in genre field 305 of the ESG content fragment. When characters "sports" are entered in genre field 305, control unit 201 may confirm that the content genre of a current program is sports.

Reference will now be made to a procedure in which digital broadcasting server 101 and portable terminal 105 operate so as to provide a digital broadcasting service, with reference to FIGS. 1 to 4.

Figure 4:
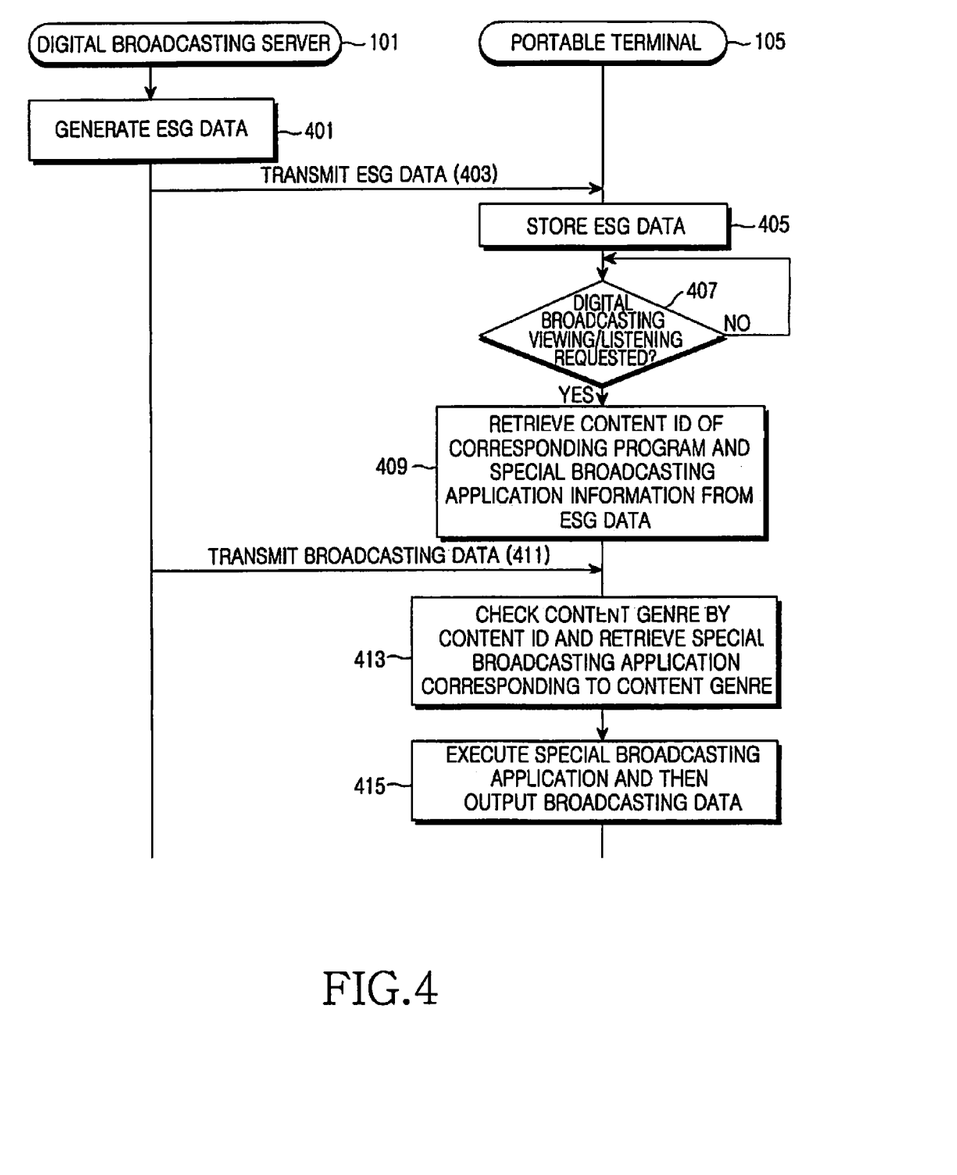
FIG. 4 is a flowchart of a procedure for providing a digital broadcasting service in a digital broadcasting system according to the present invention.

For ease of explanation, it will be assumed that digital broadcasting server 101 follows a DVB-H technology standard. Thus, guide data may be ESG data, and portable terminal 105 may be a receiving terminal for digital broadcasting that receives digital broadcasting data according to the DVB-H technology standard.

When digital broadcasting server 101 generates ESG data in step 410, it generates the ESG data in such a manner as to include a special broadcasting application field 303, which indicates broadcasting application information, in a content fragment corresponding to each broadcasting program.

In step 403, digital broadcasting server 101 transmits the ESG data through the broadcasting communication network 103. In step 405, portable terminal 105 receives and stores the ESG data transmitted by digital broadcasting server 101.

If a user requests digital broadcasting viewing/listening and selects a broadcasting channel in step 407, the portable terminal 105 proceeds to step 409. Otherwise, portable terminal 105 repetitively performs step 407.

If portable terminal 105 proceeds to step 409, it retrieves content genre information and special broadcasting application information corresponding to a currently broadcasting program included in the ESG data.

For example, portable terminal 105 may retrieve a content fragment corresponding to a program that is currently broadcasting in the broadcasting channel. Further, portable terminal 105 may retrieve the "ContentID" column included in a content ID filed 301 from the retrieved content fragment. Such a content ID field 301 may indicate the content genre information. Further, portable terminal 105 may retrieve a special broadcasting application field 303 including special broadcasting application information from the retrieved content fragment. Such a special broadcasting application field 303 may indicate the special broadcasting application information.

In step 411, portable terminal 105 receives relevant digital broadcasting data corresponding to a current program from among digital broadcasting data transmitted by digital broadcasting server 101.

In step 413, portable terminal 105 checks the content genre of the current program by means of an ID entered in the "ContentID" column that has been retrieved in step 409. Further, portable terminal 105 checks the platform type of a special broadcasting application corresponding to the current program by means of the special broadcasting application information that has been retrieved in step 409. If portable terminal 105 supports the platform type of the special broadcasting application, it retrieves a special broadcasting application corresponding to the content genre of the current program from broadcasting application storage 219 of memory unit 217.

In step 415, portable terminal 105 executes the special broadcasting application retrieved in step 413, and outputs the digital broadcasting data received in step 411 by means of the executed special broadcasting application.

The procedure of processing digital broadcasting data in a digital broadcasting system according to the present invention has been described above with reference to FIG. 4. Reference will now be made to a procedure in which portable terminal 105 executes different special broadcasting applications according to content genres of programs and outputs digital broadcasting data by means of the executed special broadcasting applications, with reference to FIGS. 1 to 5.

Figure 5:
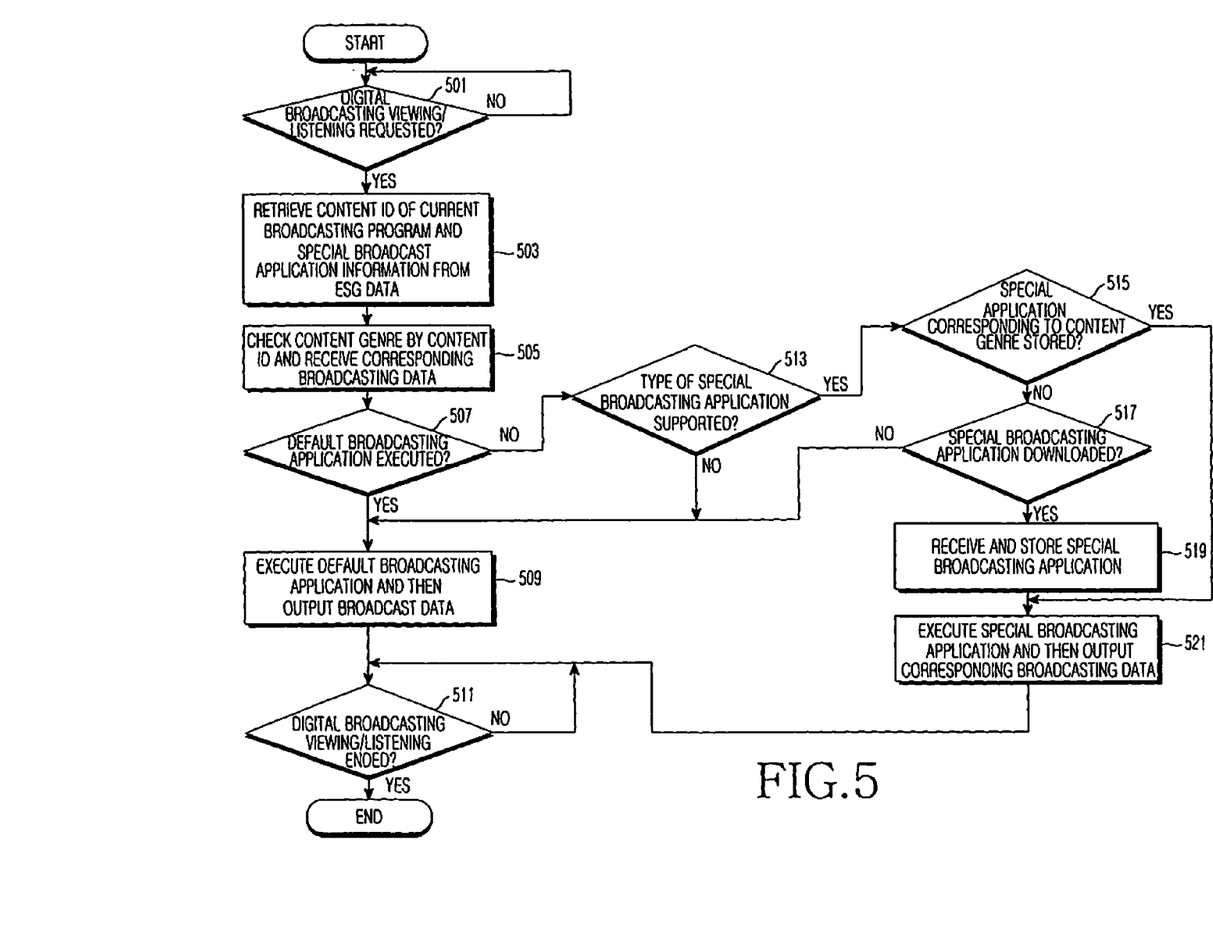
FIG. 5 is a flowchart of a procedure for performing a digital broadcasting service in a portable terminal according to the present invention.

It is assumed that portable terminal 105 is a receiving terminal for digital broadcasting that receives digital broadcasting data according to a DVB-H technology standard. Thus, guide data may be ESG data.

When portable terminal 105 stores the latest updated ESG data, control unit 201 of portable terminal 105 starts the digital broadcasting viewing/listening function in step 501 if a user requests digital broadcasting viewing/listening and selects a broadcasting channel, and then proceeds to step 503. Otherwise, control unit 201 repetitively performs step 501.

If control unit 201 proceeds to step 503, it retrieves content genre information and special broadcasting application information corresponding to a current broadcasting program from the ESG data.

For example, control unit 201 may retrieve a content fragment corresponding to a program that is currently broadcasting in the broadcasting channel. Further, control unit 201 may retrieve the "ContentID" column included in a content ID filed 301 from the retrieved content fragment. Such a content ID field 301 may indicate the content genre information. Further, control unit 201 may retrieve the "Special App" column included in a special broadcasting application field 303 from the retrieved content fragment. Such a special broadcasting application field 303 includes the special broadcasting application information.

In step 505, control unit 201 receives relevant digital broadcasting data corresponding to a current program from among digital broadcasting data transmitted by the digital broadcasting server 101. Further, control unit 201 checks the content genre of the current program by means of an ID entered in the "ContentID" column retrieved in step 503. Further, control unit 201 checks the platform type of a special broadcasting application corresponding to the current program by means of a symbol entered in the "ContentID" column retrieved in step 503.

In step 507, when the symbol entered in the "Special App" column is "0", that is, when control unit 201 confirms that only a default broadcasting application is executed for the current program, control unit 201 proceeds to step 509. Otherwise, control unit 201 proceeds to step 513.

In step 513, control unit 201 checks the platform type of a predetermined special broadcasting application according to the symbol entered in the "Special App" column. Further, the control unit checks if portable terminal 105 supports the checked platform type. Control unit 201 proceeds to step 515 if the portable terminal supports the checked platform type, and proceeds to step 509 if portable terminal 105 does not support the checked platform type.

In step 515, control unit 201 retrieves a special broadcasting application corresponding to the content genre of the current program, checked in step 505, from broadcasting application storage 219 of memory unit 217. Further, control unit 201 proceeds to step 517 if the corresponding special broadcasting application is not retrieved from broadcasting application storage 219, and proceeds to step 521 if the corresponding special broadcasting application is retrieved from broadcasting application storage 219.

In step 517, control unit 201 proceeds to step 519 if the user requests downloading the correspond special broadcasting application, and proceeds to step 509 if the user does not request downloading the corresponding broadcasting application.

If control unit 201 proceeds to step 519, it receives the corresponding special broadcasting application through the wireless transceiver unit 205 or digital broadcasting receiver unit 209, stores the received special broadcasting application in broadcasting application storage 219 of memory unit 217, and then proceeds to step 521.

As an example, control unit 201 may receive only the corresponding special broadcasting application from among special digital broadcasting applications transmitted by digital broadcasting server 101 and store the received special broadcasting application in broadcasting application storage 219.

As another example, control unit 201 may request mobile communication server 107 to transmit the corresponding special broadcasting application, receive the corresponding special broadcasting application in response to the request, and then store the received special broadcasting application in broadcasting application storage 219.

In step 521, control unit 201 retrieves the special broadcasting application stored in step 519 and executes the retrieved special broadcasting application. Further, control unit 201 outputs the digital broadcasting data received in step 505 by means of the executed special broadcast application and then proceeds to step 511.

If control unit 201 proceeds to step 509, it retrieves a default broadcasting application from broadcast application storage 219 of memory unit 217. Further, control unit 201 executes the retrieved default broadcasting application, outputs the digital broadcasting data received in step 505 by means of the executed default broadcasting application, and then proceeds to step 511.

In step 511, control unit 201 repeats step 511 unless the user requests terminating digital broadcasting viewing/listening. Otherwise, control unit 201 terminates the digital broadcasting viewing/listening function.

Reference will now be made to an example in which portable terminal 105 processes different special broadcasting applications according to content genres, with reference to FIGS. 1 to 6.

Figure 6:
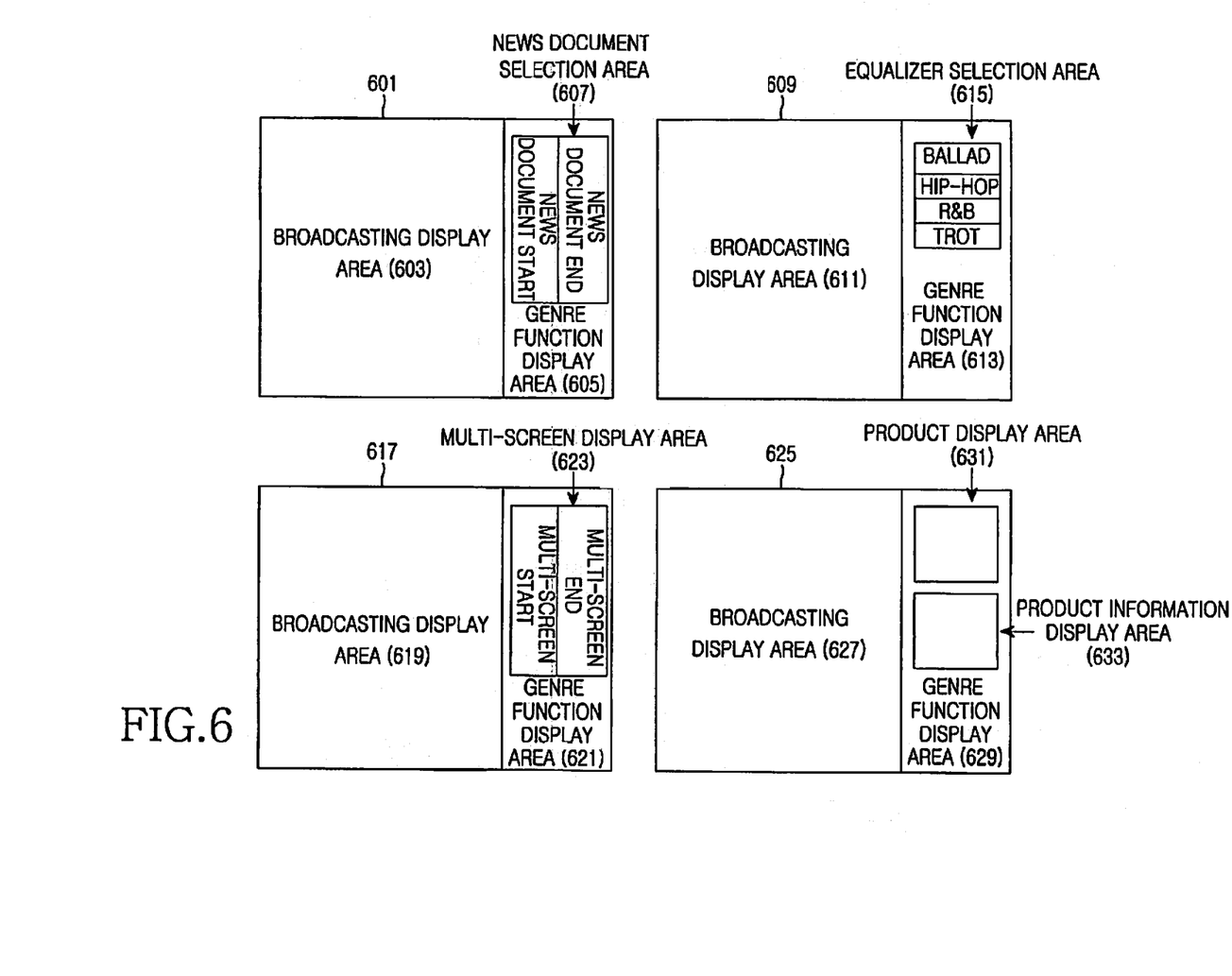
FIG. 6 is an example of a special broadcasting application according to the present invention.

Screen "601" corresponds to a special broadcasting application selected when a content genre is news. Screen "601" includes a broadcasting display area 603 and a genre function display area 605. Broadcasting display area 603 is an area for outputting news broadcasting, and genre function display area 605 is an area in which a menu for performing different functions according to genres is displayed.

For example, genre function display area 605 may include a news document selection area 607, and news document selection area 607 may include new document start and end menu items. If a user selects the news document start menu item while Screen "601" is displayed, portable terminal 105 may start a news document function and create any text file, in which news is documented, by changing the narrative voice of a current news anchor to a text. Subsequently, if the user selects the news document end menu item, portable terminal 105 may end the news document function that is currently executed.

Later on, portable terminal 105 may execute any text file in which news is documented to thereby output a text documented in the text file, anytime and anywhere.

Screen "609" corresponds to a special broadcasting application selected when a content genre is music. Screen "609" includes a broadcasting display area 611 and a genre function display area 613. Broadcasting display area 611 is an area for outputting music broadcasting, and genre function display area 613 is an area in which a menu for performing different functions according to genres is displayed.

For example, genre function display area 613 may include an equalizer selection area 615, and equalizer selection area 615 may include music genres such as Ballad, Hip-hop, R&B and Trot menu items. If a user selects the ballad menu item of the music genres included in equalizer selection area 615 while Screen "615" is displayed, portable terminal 105 may apply equalizer values, predetermined according to frequency bands in such a manner as to be suitable for ballads, to music playback.

Screen "617" corresponds to a special broadcasting application selected when a content genre is sports. Screen "617" includes a broadcasting display area 619 and a genre function display area 621. Broadcasting display area 619 is an area for outputting sports broadcasts, and genre function display area 621 is an area in which a menu for performing different functions according to genres is displayed. For example, genre function display area 621 may include a multi-screen selection area 623, and multi-screen selection area 623 may include multi-screen start and end menu items. If a user selects the multi-screen menu item while Screen "617" is displayed, portable terminal 105 may start a multi-screen function. Further, portable terminal 105 may receive digital broadcasting data, which is created by imaging the same sports scene at different angles, from digital broadcasting server 101, and display the received digital broadcasting data on one screen. Subsequently, if the user selects the multi-screen end menu item, portable terminal 105 may end the multi-screen function.

Screen "625" corresponds to a special broadcast application selected when a content genre is drama. Screen "625" includes a broadcasting display area 627 and a genre function display area 629. Broadcasting display area 627 is an area for outputting drama broadcasting, and genre function display area 629 is an area in which a menu for performing different functions according to genres is displayed. For example, genre function display area 629 may include a product display area 631 and a product information display area 633. If a user selects a product displayed in broadcasting display area 627 while Screen "625" is display, portable terminal 105 displays the external form of the selected product in product display area 631, and display information on the selected product in product information display area 633.

Through the above-mentioned procedure, portable terminal 105 may 5 execute different special broadcasting applications according to the content genre of a currently broadcasting program. Thus, portable terminal 105 may execute a special broadcasting application capable of emphasizing the characteristic of a content genre.

As described above, the present invention can provide a user with various broadcasting applications by differentiating between broadcasting applications according to various content genres, and can provide a user with broadcasting applications specific to respective content genres.

While the invention has been shown and described with reference to certain exemplary embodiments thereof, it will be understood by those skilled in the art that various changes in form and details may be made therein without departing from the spirit and scope of the invention as further defined by the appended claims.

What is claimed is:

1. A system for processing a broadcast application in digital broadcasting, the system comprising:

a digital broadcasting server for generating guide data, including content genre information corresponding to respective programs, special broadcasting application information including platform type information of the special broadcasting application, and transmitting the guide data and digital broadcasting data corresponding to the respective programs; and a portable terminal for receiving and storing the guide data, receiving digital broadcasting data corresponding to a requested program if a user requests digital broadcasting viewing and listening, analyzing the received guide data to thereby retrieve content genre information corresponding to the requested program, retrieving and executing a special broadcasting application corresponding to the retrieved content genre information, and outputting the received digital broadcast data by means of the executed special broadcasting application.

2. The system as claimed in claim 1, wherein, when the portable terminal does not support a platform type included in the platform type information, the portable terminal retrieves and executes a predetermined default broadcasting application.

3. The system as claimed in claim 2, wherein the portable terminal retrieves and executes the special broadcast application corresponding to the content genre information and the platform type information.

4. The system as claimed in claim 3, wherein, when the portable terminal supports the platform type, but does not store the special broadcast application in advance, the portable terminal retrieves and executes the default broadcast application.

5. The system as claimed in claim 4, wherein, when the portable terminal supports the platform type, but does not store the special broadcast application in advance, the portable terminal receives the special broadcast application from the digital broadcast server, stores the received special broadcast application, and executes the stored special broadcast application.

6. The system as claimed in claim 5, wherein, when the portable terminal supports the platform type, but does not store the special broadcast application in advance, the portable terminal receives the special broadcast application from a mobile communication server, stores the received special broadcast application, and executes the stored special broadcast application.

7. A digital broadcasting server method of processing a broadcast application in digital broadcasting, the method comprising the steps of:
generating, by the digital broadcasting server, content genre information corresponding to respective programs;
generating, by the digital broadcasting server, special broadcasting application information including platform type information of the special broadcasting application corresponding to the content genre information;
transmitting, by digital broadcasting server, the generated guide data including the content genre information and the special broadcasting application information; and
transmitting, by the digital broadcasting server, digital broadcasting data corresponding to the respective programs,
wherein the content genre information and the platform type information are used to retrieve and execute a special broadcasting application corresponding to the content genre information and the platform type information in a portable terminal.

8. The digital broadcasting server method as claimed in claim 7, further comprising:
transmitting, by the digital broadcasting server, the special broadcast application to a terminal when the portable terminal supports a platform type included in the platform type information, but does not store the special broadcast application in advance.

9. A method of processing a broadcast application in a digital broadcasting server, the method comprising the steps of:
generating, by the digital broadcasting server, guide data, including content genre information corresponding to respective programs and broadcasting application information and special broadcasting application information including platform type information of the special broadcasting application; and
transmitting, by the digital broadcasting server, the guide data and digital broadcasting data corresponding to the respective programs,
wherein the content genre information and the platform type information are used to retrieve and execute a special broadcasting application corresponding to the content genre information and the platform type information in a portable terminal.

10. A method of processing a broadcast application in a portable terminal, the method comprising the steps of:
receiving and storing guide data generated by a digital broadcasting server, including content genre information corresponding to respective programs and broadcast application information;
receiving digital broadcasting data corresponding to a requested program if a user requests digital broadcasting viewing and listening;
retrieving content genre information corresponding to the requested program from the received guide data;
executing a special broadcasting application corresponding to the retrieved content genre information; and
outputting the received digital broadcast data by means of the executed special broadcast application.

11. The method as claimed in claim 10, wherein the step of outputting the digital broadcasting data further comprises:
retrieving platform type information of the special broadcast application from the guide data; and
retrieving and executing a predetermined default broadcast application when the portable terminal does not support a platform type included in the platform type information.

12. The method as claimed in claim 11, wherein the step of outputting the digital broadcast data further comprises retrieving and executing the special broadcast application corresponding to the content genre information and the platform type information.

13. The method as claimed in claim 12, wherein the step of outputting the digital broadcasting data further comprises retrieving and executing the default broadcast application when the portable terminal supports the platform type, but does not store the special broadcast application in advance.

14. The method as claimed in claim 13, wherein the step of outputting the digital broadcast data further comprises:
receiving the special broadcast application from a digital broadcasting server, and storing the received special broadcast application when the portable terminal supports the platform type, but does not store the special broadcast application in advance; and
executing the stored special broadcast application.

15. The method as claimed in claim 14, wherein the step of outputting the digital broadcasting data further comprises:
receiving the special broadcast application from a mobile communication server, and storing the received special broadcast application when the portable terminal supports the platform type, but does not store the special broadcast application in advance; and
executing the stored special broadcast application.

16. An apparatus for processing a broadcast application in a digital broadcasting server, the apparatus comprising:
a generation unit for generating guide data, including content genre information corresponding to respective programs and special broadcasting application information including platform type information of the special broadcasting application; and
a transmitter for transmitting the guide data and digital broadcasting data corresponding to the respective programs,
wherein the content genre information and the platform type information are used to retrieve and execute a special broadcasting application corresponding to the content genre information and the platform type information in a portable terminal.

17. An apparatus for processing a broadcasting application in a portable terminal, the apparatus comprising:
a receiver unit for receiving guide data including content genre information corresponding to respective programs and digital broadcasting data corresponding to -respective programs from a digital broadcasting server;

an input unit for inputting a digital broadcasting program from a user;

a memory unit for storing the received guide data, the guide data including content genre information corresponding to respective programs, and storing special broadcast applications corresponding to the respective content genre information;

a display unit for displaying the special broadcast applications and the digital broadcasting data; and a control unit for controlling to receive digital broadcasting data corresponding to the program inputted from the user, to retrieve the received guide data to thereby identify content genre information corresponding to the inputted program, -to execute a special broadcasting application corresponding to the retrieved content genre information, and to output the received digital broadcasting data by means of the executed special broadcasting application.

18. The apparatus as claimed in claim 17, wherein the control unit retrieves platform type information of the special broadcasting application, and retrieves and executes a predetermined default broadcasting application when the portable terminal does not support a platform type included in the platform type information.

19. The apparatus as claimed in claim 18, wherein the control unit retrieves and executes the special broadcasting application corresponding to the content genre information and the platform type information.

20. The apparatus as claimed in claim 19, wherein, when the portable terminal supports the platform type, but does not store the special broadcasting application in advance, the control unit retrieves and executes the default broadcasting application.

21. The apparatus as claimed in claim 20, wherein, when the portable terminal supports the platform type, but does not store the special broadcast application in advance, the control unit receives the special broadcast application from the digital broadcasting server, stores the received special broadcast application, and executes the stored special broadcast application.

22. The apparatus as claimed in claim 21, wherein, when the portable terminal supports the platform type, but does not store the special broadcast application in advance, the control unit receives the special broadcast application from a mobile communication server, stores the received special broadcast application, and executes the stored special broadcast application.

* * * * *